US012583383B2

(12) United States Patent
    Kawamoto

(10) Patent No.:   US 12,583,383 B2
(45) Date of Patent:        Mar. 24, 2026

(54) VEHICLE CABIN ILLUMINATION DEVICE

(71) Applicant: MINEBEA MITSUMI Inc., Nagano
                (JP)

(72) Inventor: Satoshi Kawamoto, Hiroshima City
               (JP)

(73) Assignee: MINEBEA MITSUMI INC., Nagano
               (JP)

( * ) Notice:   Subject to any disclaimer, the term of this
                patent is extended or adjusted under 35
                U.S.C. 154(b) by 0 days.

(21) Appl. No.: 18/903,239

(22) Filed:     Oct. 1, 2024

(65)            Prior Publication Data

US 2025/0115180 A1      Apr. 10, 2025

(30)            Foreign Application Priority Data

Oct. 4, 2023     (JP) ................................. 2023-173200

(51) Int. Cl.
     *B60Q 3/66*          (2017.01)
     *B60Q 3/70*          (2017.01)
     *F21V 3/00*          (2015.01)
     *F21V 5/00*          (2018.01)
     *F21V 23/04*         (2006.01)
                (Continued)
(52) U.S. Cl.
     CPC ................. *B60Q 3/66* (2017.02); *B60Q 3/70*
        (2017.02); *F21V 3/00* (2013.01); *F21V 5/008*
        (2013.01); *F21V 23/0471* (2013.01); *F21W*
        *2106/00* (2018.01); *F21Y 2113/00* (2013.01)
(58) Field of Classification Search
     CPC ................. F21V 3/00; B60Q 3/66; B60Q 3/70
     See application file for complete search history.

(56)            References Cited

U.S. PATENT DOCUMENTS 4,617,617  A  *  10/1986  Cunningham ........... B60Q 1/30
                                                      362/267
   7,287,886  B2 *  10/2007  Iwai ........................ B60Q 3/80
                                                      362/490
                (Continued)

FOREIGN PATENT DOCUMENTS

JP          2008-201221 A      9/2008
KR          20120088126 A  *   1/2011   .......... F21V 23/0471
WO     WO-2008044460 A1 *      4/2008   ............... B60Q 3/64

OTHER PUBLICATIONS

English Machine Translation of WO 2008044460 (Year: 2008).*

*Primary Examiner* — Zheng Song
(74) *Attorney, Agent, or Firm* — Chrisman Gallo Tochtrop
LLC

(57)            ABSTRACT

The application improves a design while controlling cost
increase. In a vehicle cabin illuminating device, a first and
second cabin LEDs are housed in a case. A panel of the case
is provided with a cabin illuminator, and a light irradiated
from the first and the second cabin LEDs passes through the
cabin illuminator to illuminate inside a vehicle cabin. The
panel is provided with a decorative illuminator having a
decorative translucent portion that can transmit light, and the
first lens housed in the case guides light from the first cabin
LED to a back side of the decorative illuminator, and the
second lens housed in the case guides light from the second
cabin LED to the back side of the decorative illuminator.
Thus, the decorative illuminator can be illuminated using the
first and second cabin LEDs for illuminating inside the
vehicle cabin, thereby decorating the vehicle cabin illumi-
nating device.

5 Claims, 10 Drawing Sheets

(51) Int. Cl.
*F21W 106/00* (2018.01)
*F21Y 113/00* (2016.01)

(56) References Cited

U.S. PATENT DOCUMENTS

| 10,106,078 | B1 * | 10/2018 | Chen | F21V 19/0015 |
| 11,479,167 | B2 * | 10/2022 | Ibáñez | B60Q 3/74 |
| 2006/0187659 | A1 * | 8/2006 | Nawashiro | B60Q 3/76 |
| | | | | 362/234 |
| 2008/0049435 | A1 * | 2/2008 | Yoshihara | F21V 29/74 |
| | | | | 362/488 |
| 2009/0251912 | A1 * | 10/2009 | Kino | B60Q 3/64 |
| | | | | 362/492 |
| 2009/0316421 | A1 * | 12/2009 | Kracker | B60Q 3/74 |
| | | | | 362/488 |
| 2022/0203890 | A1 * | 6/2022 | Ibáñez | B60Q 3/60 |

* cited by examiner

VEHICLE CABIN ILLUMINATION DEVICE

CROSS-REFERENCE TO RELATED APPLICATIONS

This application claims the benefit of Japanese Application No. 2023-173200, filed Oct. 4, 2023, the entire disclosure of which is hereby incorporated herein by reference.

TECHNICAL FIELD

The present invention relates to a vehicle cabin illumination device.

BACKGROUND ART

An overhead console (referred to as "OH console") described in patent literature 1 below is provided at a front-end of a vehicle ceiling in a center of a vehicle width direction. The OH console has a spotlight, a switch, a small item storage, an ultrasonic sensor, and so on. When an occupant operates the switch, the spotlight illuminates a vehicle cabin.

PATENT LITERATURE

Japanese Unexamined Patent Application Publication No. 2008-201221

SUMMARY OF INVENTION

Technical Problem

In the vehicle cabin illumination device such as the OH console described above, for example, a design of the vehicle cabin illumination device can be improved by providing a decorated illuminating portion (hereinafter referred to as "decorative illuminator") in addition to an illuminator that illuminates the vehicle cabin. However, installing a separate light source to illuminate the decorative illuminator may increase a cost of the vehicle cabin illumination device. Therefore, it is desirable for the vehicle cabin illumination device to have a structure that can improve the design while controlling a cost increase.

In consideration of the above facts, the present invention provides the vehicle cabin illumination device that can improve the design while controlling the cost increase.

Solution to Problem

One or more embodiments of the present invention is a vehicle cabin illumination device comprising: a first light source that irradiates light toward a vehicle cabin side; a second light source that irradiates light toward the vehicle cabin side; a case comprising: a cabin illuminator that houses the first light source and the second light source and illuminates a vehicle cabin by transmitting light irradiated from the first light source and the second light source; and a decorative illuminator having a translucent portion that can transmit light; a first lens that is housed in the case and guides light irradiated from the first light source to a back side of the decorative illuminator; and a second lens that is housed in the case and guides light irradiated from the second light source to the back side of the decorative illuminator.

Advantageous Effect of Invention

According to one or more embodiments of the invention, a design can be improved while controlling a cost increase.

DESCRIPTION OF EMBODIMENT

Figure 1:
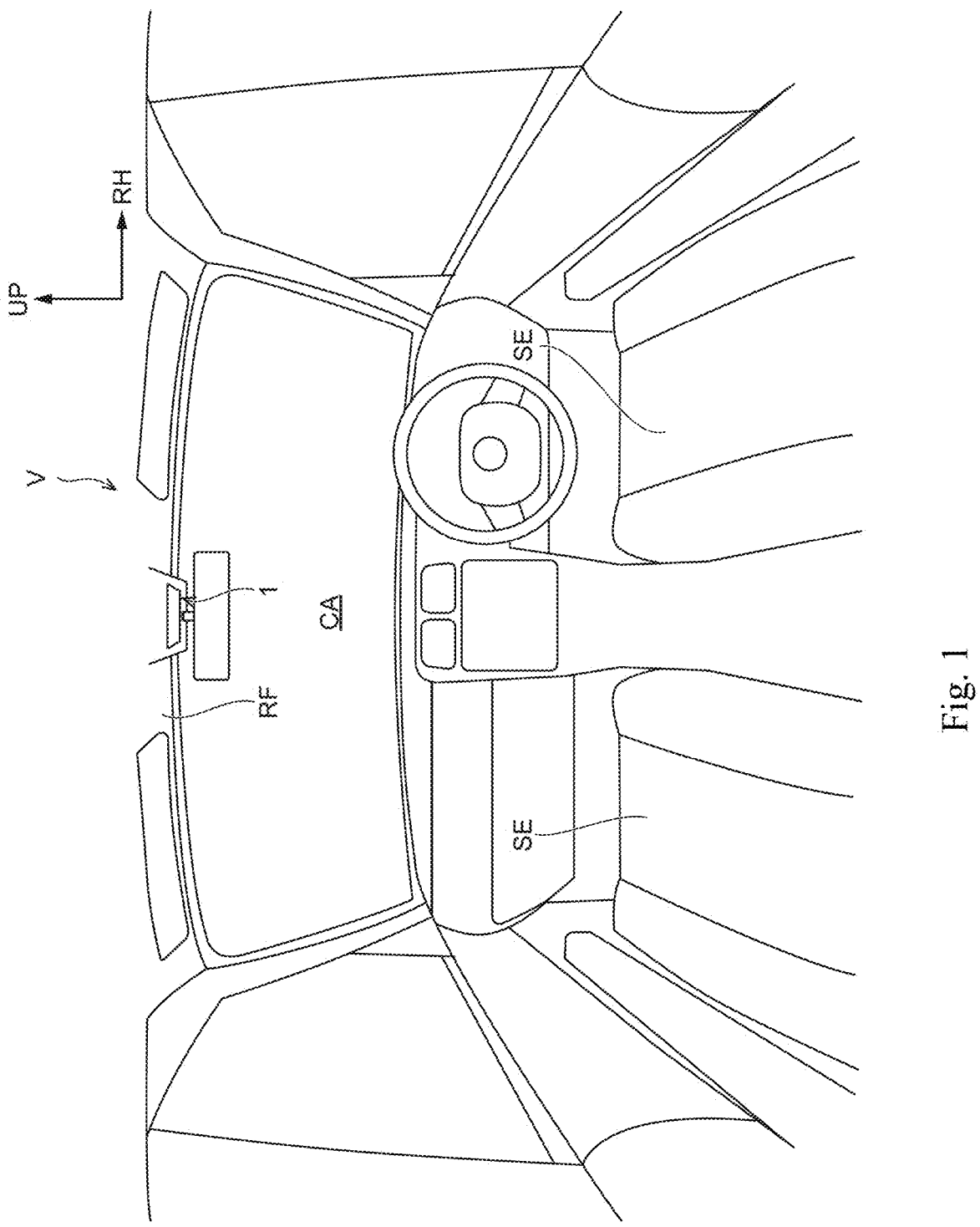
FIG. 1 is a rear view from a rear of a vehicle illustrating a vehicle cabin to which a vehicle cabin illumination device according to the present embodiment is applied.
Figure 2:
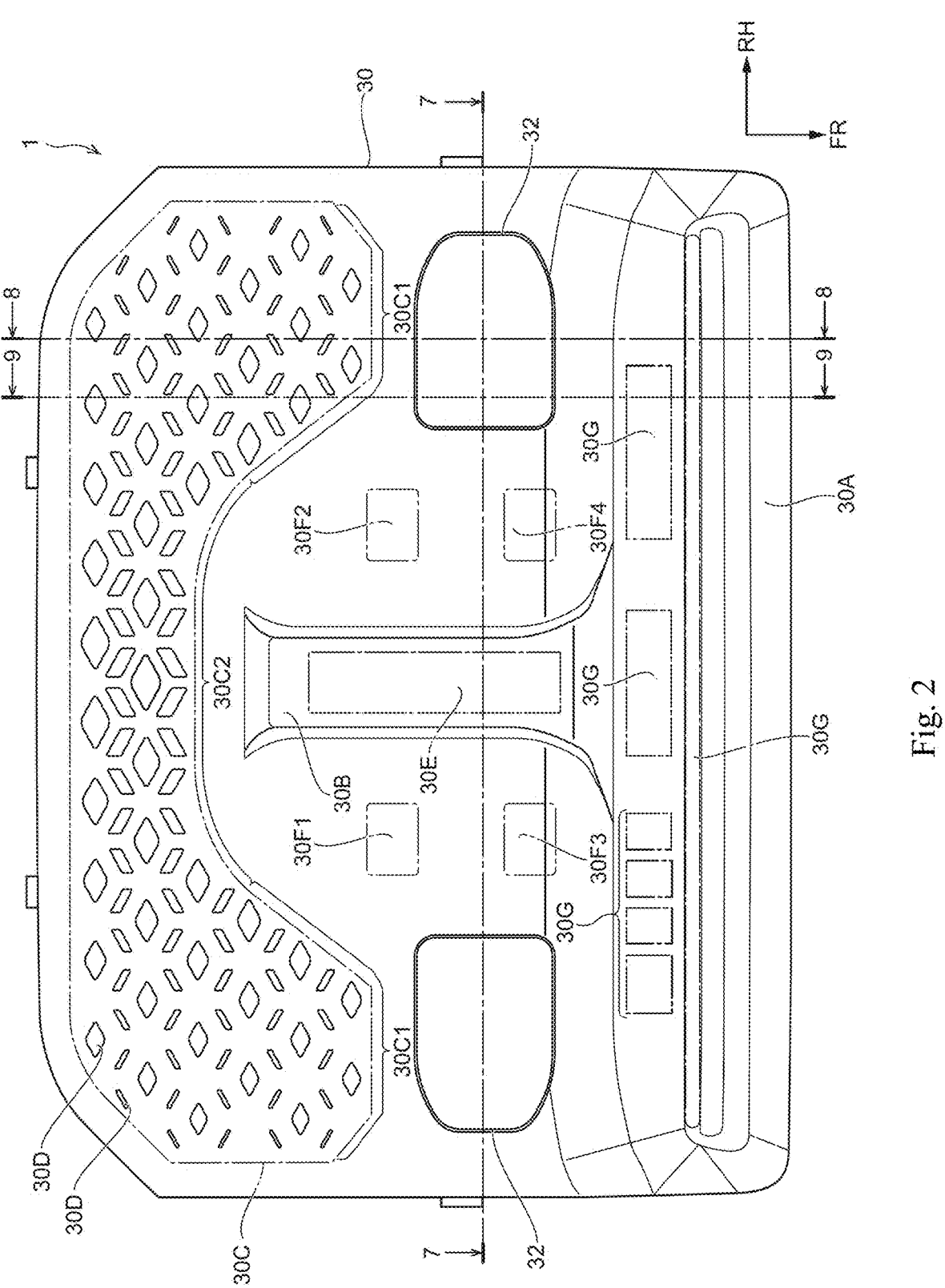
FIG. 2 is a bottom view of the vehicle cabin illumination device illustrated in FIG. 1, viewed from below the vehicle.
Figure 3:
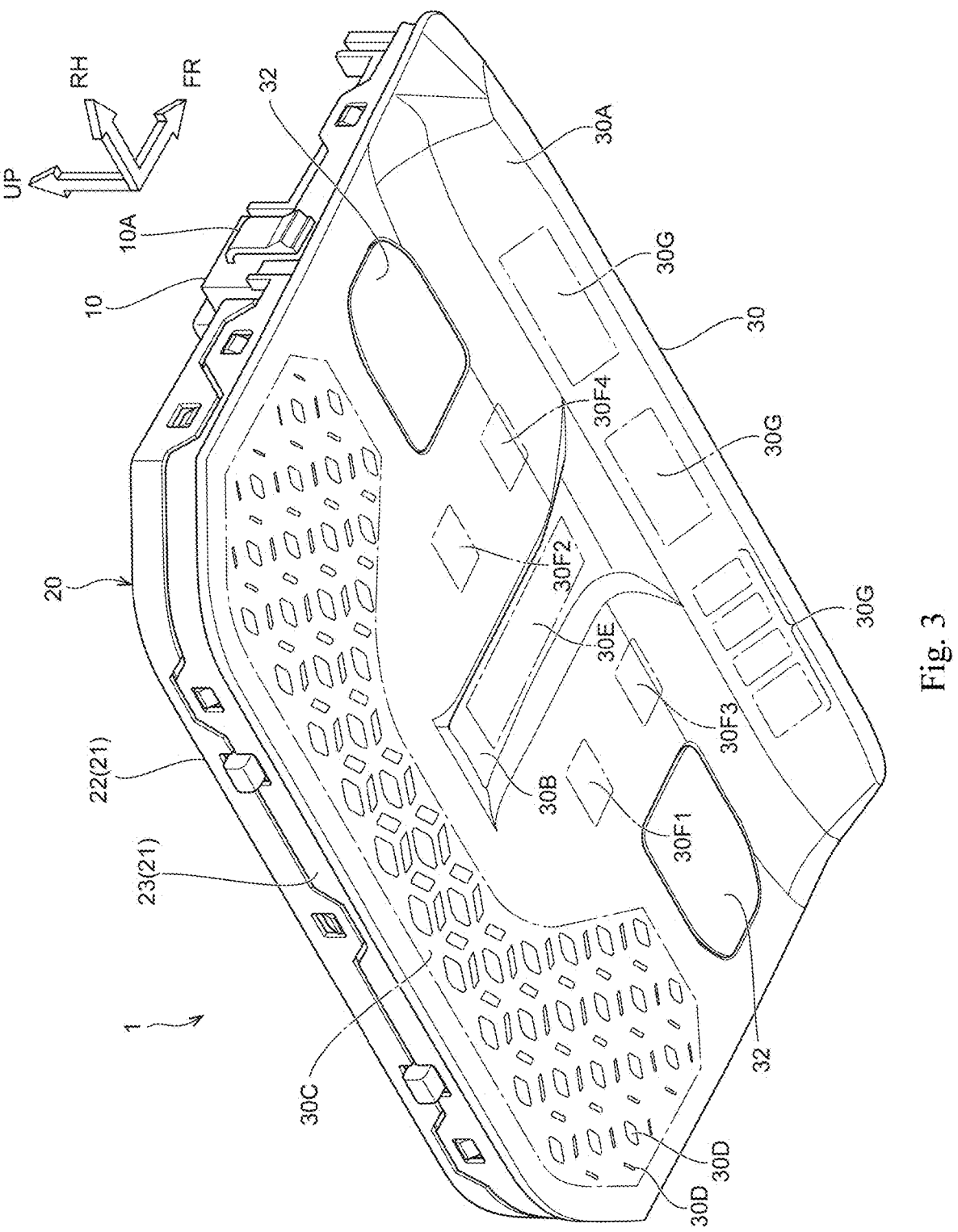
FIG. 3 is an oblique view of the vehicle cabin illumination device illustrated in FIG. 2, viewed from a right oblique rear side of the vehicle.

Hereinafter, a vehicle cabin illumination device 1 according to the present embodiment will be described with reference to the drawings. As illustrated in FIG. 1, the vehicle cabin illumination device 1 is configured as a device for illuminating an inside of a vehicle cabin CA in a vehicle (automobile) V. The arrows UP, FR, and RH illustrated in the drawings as appropriate indicate upper side of the vehicle, front side of the vehicle, and right side of the vehicle (one side of vehicle width direction), respectively. In a following description, when directions up-down, front-back, and left-right are used, they refer to vehicle up and down direction, vehicle front and back directions, and vehicle left and right directions unless otherwise noted.

As illustrated in FIG. 2 to FIG. 5, the vehicle cabin illumination device 1 as a whole is formed in a substantially rectangular flat shape with the up-down direction as thickness direction and the left-right direction as longitudinal direction. The vehicle cabin illumination device 1 is provided in a center in the lift-right direction on a front-end portion of a ceiling RF of the vehicle cabin CA (see FIG. 1), and a panel 30 described further below is exposed from the ceiling RF to a vehicle cabin CA side. The vehicle cabin illumination device 1 comprises a frame 10, a case 20, a substrate 50, a first lens 60, and a second lens 70. Each of the components of the vehicle cabin illumination device 1 will be described below.

Frame 10

As illustrated in FIG. 4 and FIG. 7 to FIG. 9, the frame 10 constitutes a framework of the vehicle cabin illumination device 1, and is formed in a substantially rectangular shape with the left-right direction as the longitudinal direction when viewed from below (from inside of the vehicle cabin CA). Fixing claws 10A are provided at both ends of the frame 10 in the left-right direction, and the vehicle cabin illumination device 1 is fixed to the ceiling RF by engaging the fixing claws 10A to the ceiling RF of the vehicle cabin CA.

At a rear of the frame 10 is a lens housing 10B housing the first lens 60 and the second lens 70 described further below. The lens housing 10B is formed in a substantially U-shaped cylindrical shape, which is open to the front side when viewed from below. In a middle of the frame 10 in the front-back direction, a left and right pair of first cylinders 10C (see FIG. 7) are formed at outer ends in the left-right direction, and the first cylinder 10C is formed in a substantially rectangular cylindrical shape with the up-down direction as axis direction. An inner circumference surface of a lower portion of the first cylinder 10C slopes inward toward an upper side, and a step protruding inward of the first cylinder 10C is formed at a boundary between upper and lower portions of the first cylinder 10C. An inclination angle of an outer side surface in the left-right direction on the inner circumference surface of the lower portion of the first cylinder section 10C is set larger than the inclination angles of the other surfaces. In the middle of the frame 10 in the front-back direction, a left and right pair of second cylinders 10D are formed (see FIG. 7). The second cylinder 10D is disposed an inner side in the left-right direction of the first cylinder 10C, and is formed in a substantially bottom rectangular cylinder open to the upper side. A rectangular translucent hole 10E is formed through a lower wall of the second cylinder 10D. The first cylinder 10C and the second cylinder 10D are disposed on the front side of the outer ends of the lens housing 10B in the left-right direction, and the first cylinder 10C and the second cylinder 10D are made to communicate with the lens housing 10B.

Figure 4:
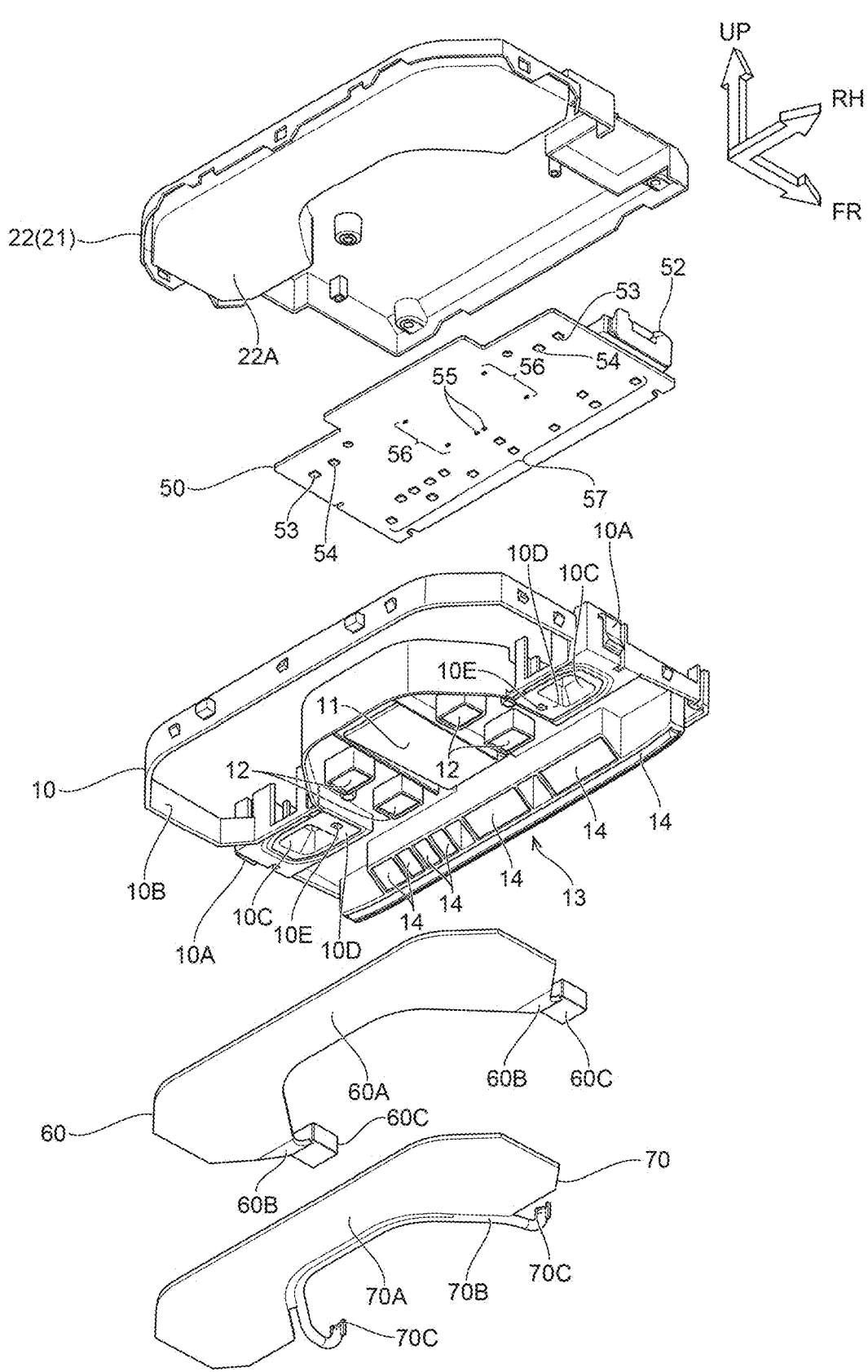
FIG. 4 is an exploded view of the vehicle cabin illumination device illustrated in FIG. 3 with a lower case and a panel removed.
Figure 5:
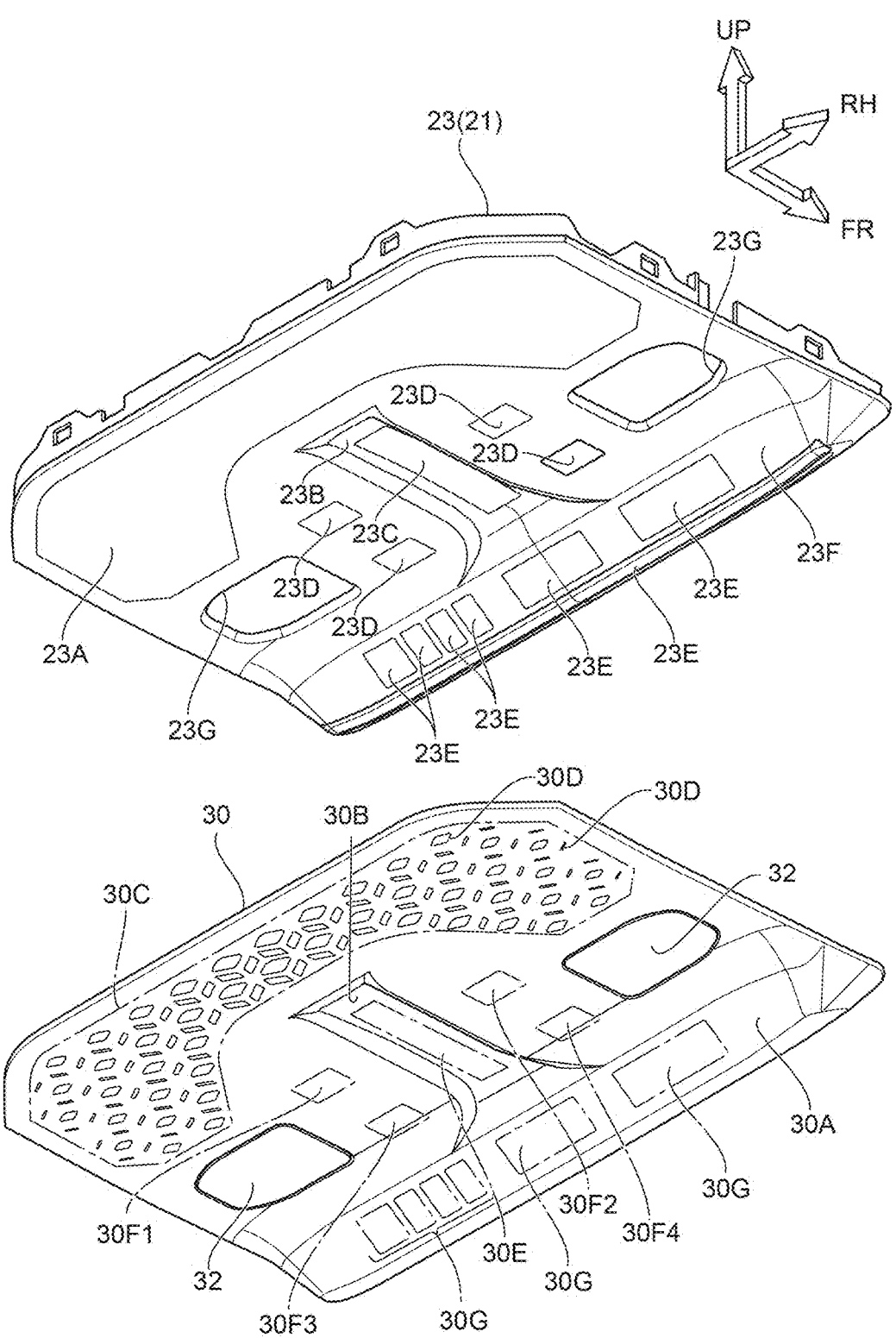
FIG. 5 is an exploded view of the panel illustrated in FIG. 3 removed from the lower case.
Figure 6:
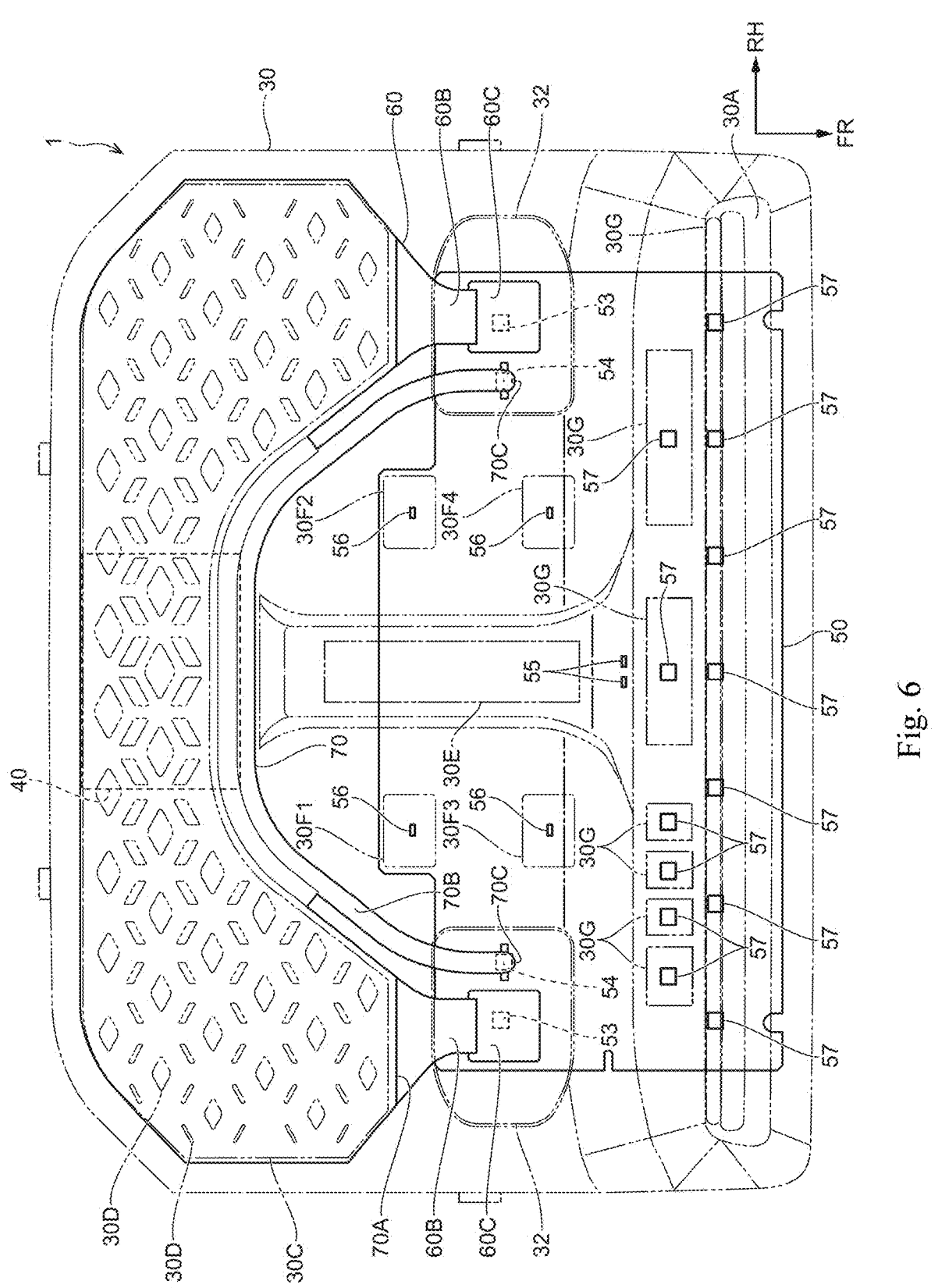
FIG. 6 is the bottom view from below the vehicle illustrating a positioning of a first lens, a second lens, and a substrate illustrated in FIG. 4.

As illustrated in FIG. 4, a center light guide lens 11 is provided in the center of the frame 10 in the left-right direction, in the middle of the front-back direction. The center light guide lens 11 is formed in a substantially rectangular plate with the up-down direction as the thickness direction and the front-back direction as the longitudinal direction, and the front end of the center light guide lens 11 is bent to the upper side. In the middle of the frame 10 in the front-back direction, a front and back pair of side light guide lenses 12 are provided outside the center light guide lens 11 in the left-right direction, respectively. In other words, the frame 10 is provided with four side light guide lenses 12. The side light guide lenses 12 are formed in a substantially rectangular block. The center light guide lens 11 and the side light guide lenses 12 are formed of a material that can transmit light.

The front end of the frame 10 is provided with an indicator lens group 13. The indicator lens group 13 is comprised of a plurality of indicator light guide lenses 14, and the indicator light guide lenses 14 are formed of the material that can transmit the light.

Case 20

As illustrated in FIG. 2 through FIG. 9, the case 20 constitutes an outer contour of the vehicle cabin illumination device 1. The case 20 has a case body 21 and a panel 30. The case body 21 is described below, and the panel 30 is described further below. The case body 21 is comprised of case components divided into two parts, upper and lower. Specifically, the case body 21 comprises an upper case member 22 that constitutes the upper portion of the case body 21 and a lower case member 23 that constitutes the lower portion of the case 20.

The upper case member 22 is formed in a substantially rectangular box open downwardly, and is assembled to an outer circumference of the frame 10 by means of a claw fit, covering the frame 10 from the upper side. A sensor housing 22A is formed at the rear of the upper case member 22, which rises downward. The sensor housing 22A is formed in a shape corresponding to the lens housing 10B of the frame 10 when viewed from below, and is formed in a concave shape open to the upper side and fitted into the lens housing 10B.

A radio wave sensor 40 (see FIG. 6, FIG. 8, and FIG. 9) is housed in the center of the sensor housing 22A in the left-right direction. The radio wave sensor 40 is a sensor using radio waves such as ultrasonic, millimeter wave, infrared, and visible light, and is electrically connected to a controller 51 described further below. The radio wave sensor 40 is configured as the sensor for detecting an occupant's entry into the vehicle cabin CA. Specifically, the radio wave sensor 40 has a transmitter and a receiver. The transmitter transmits the radio wave toward the inside of the vehicle cabin CA, and the receiver receives a reflected wave of the radio wave transmitted from the transmitter. The controller 51 then determines, based on a waveform of the reflected wave, whether the occupant is boarding inside the vehicle cabin CA. The radio wave sensor 40 can be used, for example, in an anti-theft device for detecting unauthorized entry into the vehicle cabin, and in a left behind detection device for detecting a child left behind in the vehicle cabin, and in other devices having various functions installed in the vehicle.

The lower case member 23 is formed in the substantially rectangular box with a relatively shallow bottom that is open to the upper side, and is assembled to the outer circumference of the frame 10 by means of the claw fit, covering the frame 10 from below. The lower case member 23 is comprised of a light-impermeable resin material. The lower case member 23 is provided with a case-side first translucent portion 23A at a position corresponding to the lens housing 10B of the frame 10, and the case-side first translucent portion 23A is formed in the shape corresponding to the lens housing 10B viewed from below. The lower case member 23 has a case-side depression 23B below the center light guide lens 11 of the frame 10. The case-side depression 23B is formed in the concave shape that is raised to the upper side and open downwardly, and extends in the front-back direction. A case-side second translucent portion 23C is provided in the case-side depression 23B, and the case-side second translucent portion 23C is formed in the substantially rectangular shape with the front-back direction as the longitudinal direction. The lower case member 23 has case-side third translucent portions 23D at the positions corresponding to the side light guide lenses 12 of the frame 10, and the case-side third translucent portions 23D are formed in the substantially rectangular shape viewed from below. The lower case member 23 has case-side fourth translucent portions 23E at the positions corresponding to the indicator light guide lenses 14 of the frame 10. The case-side fourth translucent portions 23E are formed in shapes corresponding to the indicator light guide lenses 14 viewed from below. The case-side first translucent portion 23A, the case-side second translucent portion 23C, the case-side third translucent portions 23D, and the case-side fourth translucent portions 23E are formed of a resin material that can transmit light, and these translucent portions and the lower case member 23 are formed as one piece by a two-color molding or other method.

A case-side ridge 23F raised downwardly is formed at the front-end of the lower case member 23, and the case-side ridge 23F is extended in the left-right direction. The case-side ridge 23F is formed in a substantially V-shape open to the upper side when viewed from the left-right direction, and the case-side fourth translucent portions 23E described above is formed on a rear wall and a lower end of the case-side ridge 23F. In the middle of the lower case member 23 in the front-back direction, on outer portions in the left-right direction, a left and right pair of case-side openings 23G are formed through. The case-side openings 23G are formed in the substantially rectangular shape with the left-right direction as the longitudinal direction. A size of the case-side openings 23G is set so that the first cylinder 10C and the second cylinder 10D of the frame 10 are positioned inside the case-side openings 23G when viewed from below.
Substrate 50

As illustrated in FIG. 4 and FIG. 6 to FIG. 9, the substrate 50 is formed as the substantially rectangular plate with the up-down direction as the thickness direction and the left-right direction as the longitudinal direction. The substrate 50 is disposed on the upper side of the front portion of the frame 10, sandwiched in the up-down direction between the frame 10 and the upper case member 22, and fastened to the frame 10 together with the upper case member 22 by a screw SC (see FIG. 8). Specifically, the substrate 50 is disposed on the front side of the lens housing 10B. This setting ensures that the radio wave sensor 40 and the substrate 50 do not overlap when viewed from below. The controller 51 (see FIG. 7) is provided on a top surface of the substrate 50. A connector 52 is provided at a right end of the top surface of the substrate 50, and the connector 52 is electrically connected to the controller 51. A vehicle-side connector (not illustrated) is plugged into the connector 52 to supply power to the substrate 50.

At a rear end of a lower surface of the substrate 50, first cabin LEDs 53 as a left and right pair of first light sources are provided at the outer end in the left-right direction. The first cabin LEDs 53 are positioned in the first cylinder 10C of the frame 10 when viewed from below (see FIG. 7), and irradiates light downward. At the rear end of the lower surface of the substrate 50, second cabin LEDs 54 as a left and right pair of second light sources are provided respectively. The second cabin LEDs 54 are positioned opposite the translucent hole 10E in the second cylinder 10D in the frame 10, viewed from below (see FIG. 7), and irradiates light downward.

On the lower surface of the substrate 50, a left and right pair of center button LEDs 55 are provided. The center button LEDs 55 are positioned on the upper side of the front-end of the center light guide lens 11. The center button LEDs 55 irradiate light downward, and light entering the front-end of the center light guide lens 11 is guided backward in the center light guide lens 11. On the lower surface of the substrate 50, side button LEDs 56 are provided on the upper side of the side light guide lens 12, respectively. The side button LEDs 56 irradiate light downward, and light is transmitted through the side light guide lens 12 and guided to the lower surface of the side light guide lens 12. On the lower surface of the substrate 50, a plurality of indicator LEDs 57 are provided on the upper side of the indicator light guide lens 14. The indicator LEDs 57 irradiate light downward, and light is transmitted through the indicator light guide lens 14 and guided to the lower surface of the indicator light guide lens 14. These LEDs are electrically connected to the controller 51 and are lit or unlit by the controller 51.
Panel 30

As illustrated in FIG. 2, FIG. 3, and FIG. 5 to FIG. 9, the panel 30 is formed in a substantially rectangular sheet shape with the up-down direction as the thickness direction and the left-right direction as the longitudinal direction. The panel 30 is formed integrally with the lower case member 23 so as to cover the lower surface and side surface of the lower case member 23. In other words, a panel-side ridge 30A corresponding to the case-side ridge 23F of the lower case member 23 is formed at the front-end of the panel 30. The panel-side ridge 30A is formed in the substantially V-shape, open to the upper side, when viewed from the left-right direction. A panel-side depression 30B corresponding to the case-side depression 23B of the lower case member 23 is formed in the center of the panel 30 in the left-right direction. The panel-side depression 30B is formed in the concave shape that is raised to the upper side and open downwardly, and extends in the front-back direction. The panel 30 is formed of the material that can transmit light, and the top surface of the panel 30 is painted for light shielding. This makes the panel 30 impenetrable to light.

At the rear of the panel 30, a decorative illuminator 30C is provided at the position opposite to the case-side first translucent portion 23A of the lower case member 23, and the decorative illuminator 30C is formed to correspond to the case-side first translucent portion 23A when viewed from below. In other words, the decorative illuminator 30C extends in the left-right direction, is disposed below the radio wave sensor 40, and covers the radio wave sensor 40 from below. The decorative illuminator 30C has a plurality of decorative translucent portions 30D as translucent portions, and a predetermined pattern is formed in the decorative illuminator 30C by the plurality of decorative translucent portions 30D. Specifically, the decorative translucent portion 30D is not painted for light shielding, and the decorative illuminator 30C is illuminated in the predetermined pattern when light irradiated from the first lens 60 and the second lens 70 (described further below) passes through the decorative translucent portion 30D. In the drawings, only specific decorative translucent portion 30D is labeled with a reference symbol for the sake of convenience. The outer portion of the decorative illuminator 30C in the left-right direction is a first decorative illuminator 30C1, and the middle of the decorative illuminator 30C in the left-right direction is a second decorative illuminator 30C2. The first decorative illuminator 30C1 and the second decorative illuminator 30C2 are aligned continuously in the left-right direction (see FIG. 2).

The portion positioned below the case-side second translucent portion 23C of the lower case member 23 in the panel-side depression 30B of the panel 30 is a center touch button 30E. The center touch button 30E is configured as an operator for operating a sunroof (not illustrated) provided on the ceiling RF. The portions positioned below the case-side third translucent portion 23D of the lower case member 23 in the panel 30 are the side touch buttons 30F1 to 30F4. The side touch buttons 30F1 to 30F4 are configured as the operators used to lit or unlit the first cabin LED 53 and the second cabin LED 54. The center touch button 30E and side touch buttons 30F1 to 30F4 are formed with a display (not illustrated), which has letters, figures, symbols, marks, and so on. The display is configured in the same manner as the decorative translucent portions 30D. In other words, the display is not painted for light shielding, and the display is illuminated by light irradiated downward from the case-side second translucent portion 23C and the case-side third translucent portion 23D which passes through the display.

On the upper side of the lower case member 23, detection electrodes (not illustrated) are disposed at the positions corresponding to the center touch button 30E and the side touch buttons 30F1 to 30F4, respectively. Each detection electrode is connected to the substrate 50 and electrically connected to the controller 51. The detection electrodes detect the contact (proximity) of the occupant's fingers with the center touch button 30E and the side touch buttons 30F1 to 30F4. Specifically, when the occupant's finger contacts the center touch button 30E (side touch buttons 30F1 to 30F4), a capacitance between the detection electrode and the occupant's finger increases, and the controller 51 detects the occupant's finger contacting the center touch button 30E (side touch buttons 30F1 to 30F4) based on an output from the detection electrode. Thereby, the center touch button 30E and the detection electrode constitute a touch switch, and the side touch buttons 30F1 to 30F4 and the detection electrode constitute the touch switch.

The portion positioned below the case-side fourth translucent portion 23E of the lower case member 23 in the panel 30 is an indicator 30G. The indicator 30G has the display (not illustrated), which has letters, figures, symbols, marks, and so on. This display is configured in the same manner as the center touch button 30E and the side touch buttons 30F1 to 30F4. In other words, the display is not painted for light shielding, and the display in the indicator 30G is illuminated by light irradiated downward from the case-side fourth translucent portion 23E, which passes through the display.

An opening cover 30H is formed at the position corresponding to the case-side opening 23G of the lower case member 23 in the panel 30. (see FIG. 7) The opening cover 30H is formed in a frame shape viewed from below to cover the inner circumference surface of the case-side opening 23G, and is formed in a substantially crank shape viewed from circumferential direction of the case-side opening 23G. As a result, a panel side opening 30J formed by the opening cover 30H is formed through the panel 30 in the up-down direction, so that the first cylinder 10C and the second cylinder 10D of the frame 10 are positioned within the panel side opening 30J viewed from below.

A pair of left and right cabin illuminators 32 are provided within the opening cover 30H of the panel 30. The cabin illuminators 32 are formed in the substantially rectangular sheet shape with the up-down direction as the thickness direction, and are made of the material that can transmit light. The cabin illuminators 32 are disposed adjacent below the first cylinder 10C and the second cylinder 10D of the frame 10.

First Lens 60

As illustrated in FIG. 4 and FIG. 6 to FIG. 9, the first lens 60 is comprised of the material that can transmit light. The first lens 60 has a first lens body 60A, and the first lens body 60A is formed in a substantially long plate shape with the up-down direction as the thickness direction and extending in the left-right direction. Specifically, the first lens body 60A is formed in the substantially U-shape open to the front side viewed from below to fill up the lens housing 10B of the frame 10, and is housed within the lens housing 10B. A connector 60B is formed at the front-ends of both ends of the first lens 60 in the left-right direction, and the connector 60B is bent to the upper oblique forward side.

A lens base 60C is provided on the front side of both ends of the first lens body 60A in the left-right direction, respectively. The lens base 60C is formed in the shape of a substantially bottomed rectangular cylinder open to the upper side and is disposed in the upper portion of the first cylinder 10C of the frame 10. The lens base 60C is disposed on the upper side than the first lens body 60A, and the connector 60B of the first lens body 60A is connected to the lower end of the lens base 60C. The lens base 60C is sandwiched top and bottom by the first cylinder 10C and the substrate 50, and the first cabin LED 53 is positioned within the opening of the lens base 60C.

Figure 7:
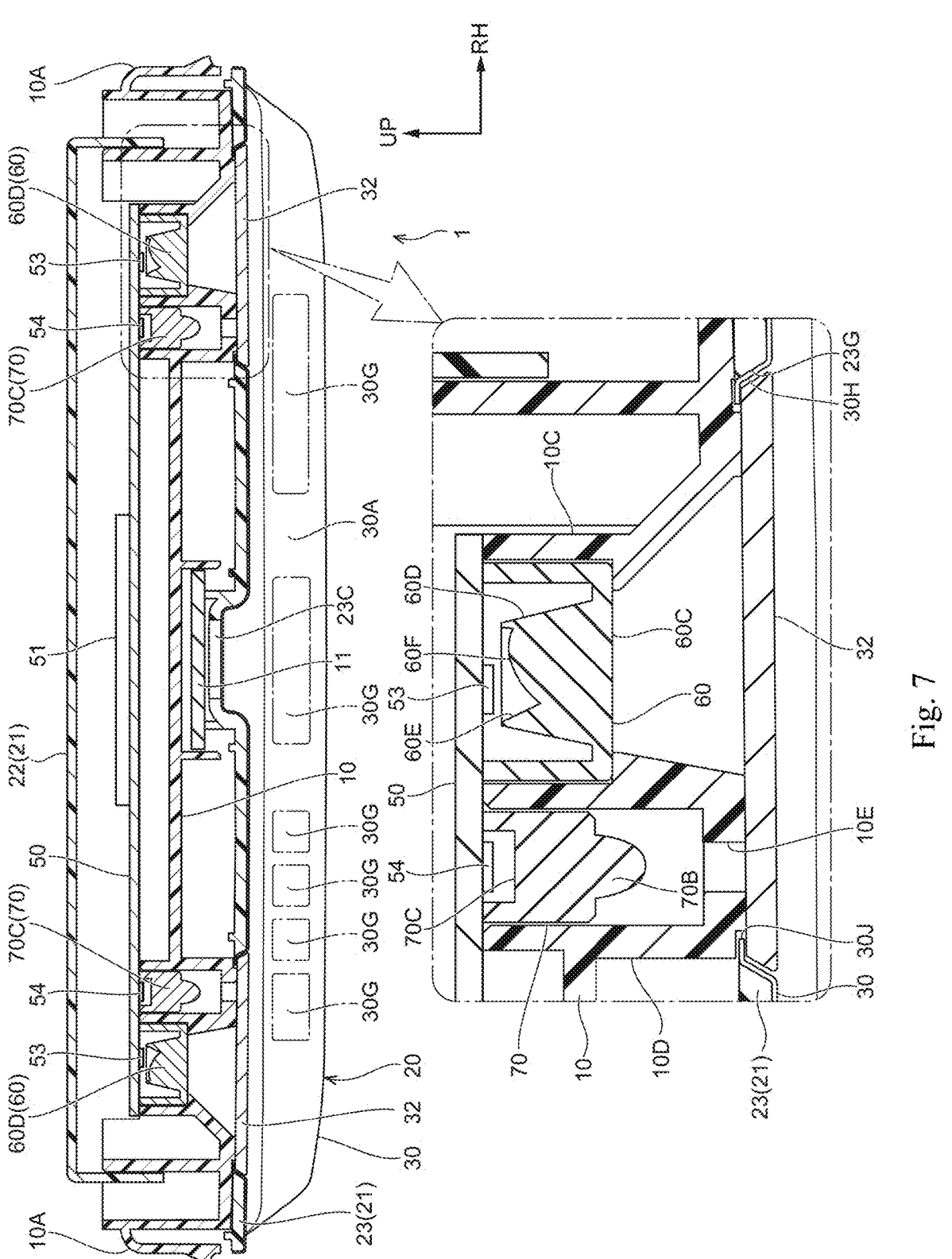
FIG. 7 is a cross-sectional view from the rear of the vehicle illustrating an inside of the vehicle cabin illumination device illustrated in FIG. 2 (7-7 line cross-sectional view of FIG. 2).
Figure 8:
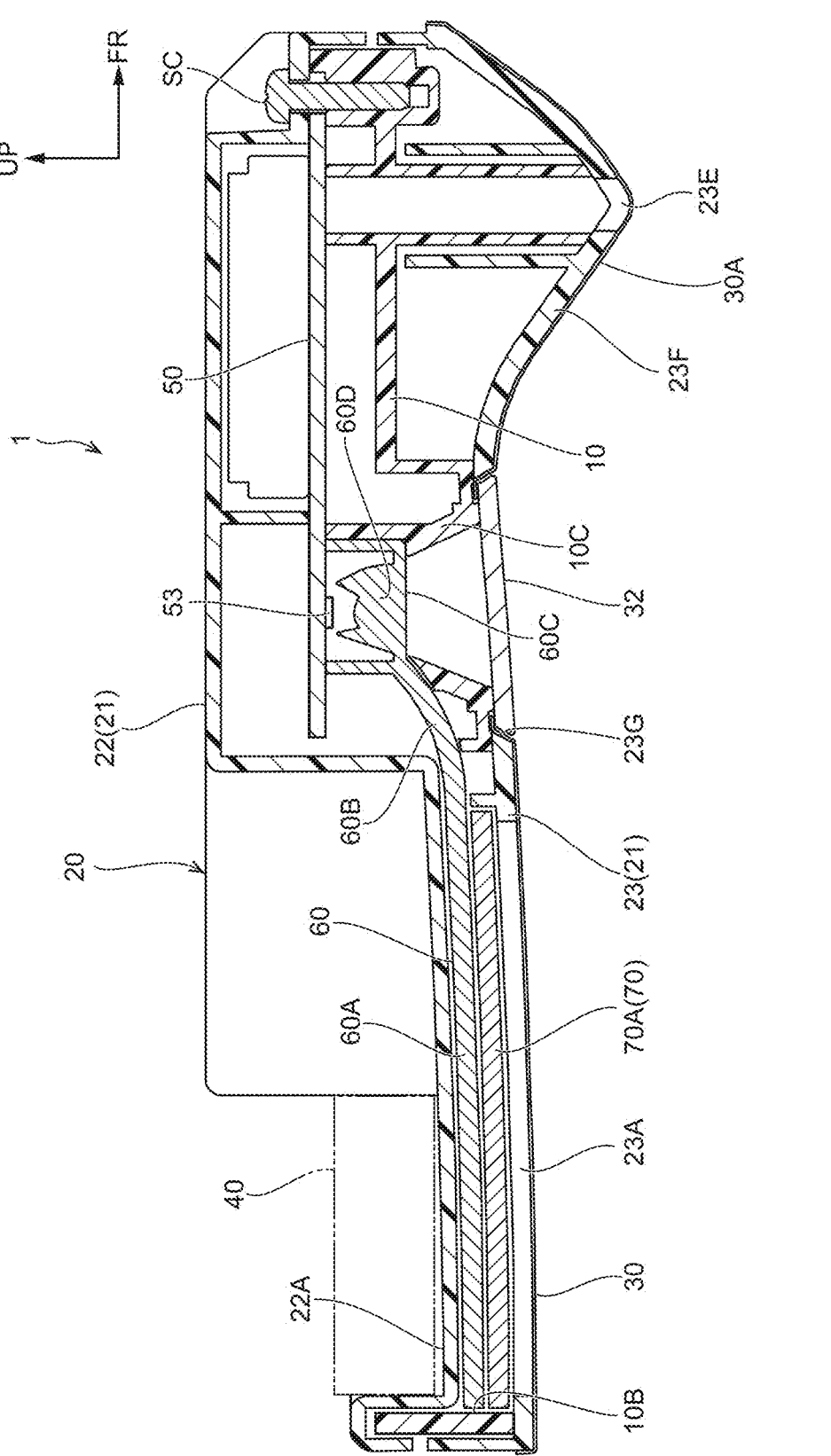
FIG. 8 is the cross-sectional view from a right side of the vehicle illustrating the inside of the vehicle cabin illumination device illustrated in FIG. 2 (8-8 line cross-sectional view of FIG. 2).
Figure 9:
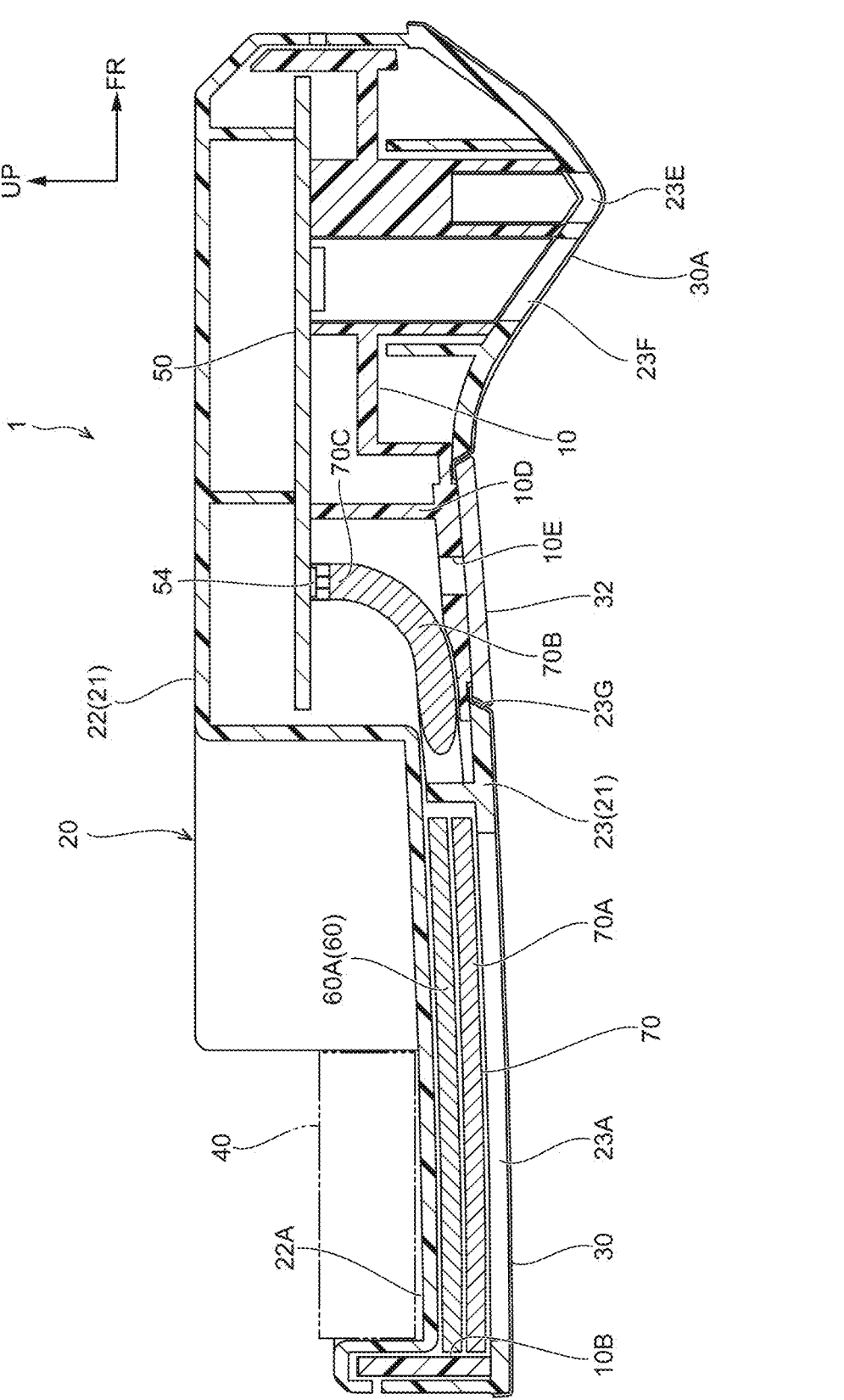
FIG. 9 is the cross-sectional view from the right side of the vehicle illustrating the inside of the vehicle cabin illumination device illustrated in FIG. 2 (9-9 line cross-sectional view of FIG. 2).

Inside the lens base 60C is a light-entering portion 60D (see FIG. 7). The light-entering portion 60D is formed in a substantially square weight and projects upward from the lower wall of the lens base 60C. A top surface of the light-entering portion 60D is formed along a plane orthogonal to the up-down direction. The top surface of the light-entering portion 60D has a concave 60E (see FIG. 7) open to the upper side, and the inner circumference surface of the concave 60E slopes inwardly toward below. The first cabin LED 53 is positioned in the concave 60E, when viewed from below. A convex curved surface 60F (see FIG. 7) is formed on the bottom surface of the concave 60E, and the convex curved surface 60F is disposed in a position outside of the first cabin LED 53 in the left-right direction when viewed from the rear side. The convex curved surface 60F is formed in a substantially arc shape that is convex toward the first cabin LED 53 when viewed from the rear side. As a result, light irradiated downwardly from the first cabin LED 53 is guided outwardly in the left-right direction by the light-entering portion 60D and transmitted through the cabin illuminator 32 of the panel 30 to mainly illuminate the vehicle seat SE (see FIG. 1) of the vehicle V, which is positioned outside the vehicle cabin illumination device 1 in the left-right direction.

When the first cabin LED 53 is lit, light entering the light-entering portion 60D is guided to the first lens body 60A by the connector 60B, and light guided to the first lens body 60A mainly illuminates the first decorative illuminator 30C1 of the decorative illuminator 30C in the panel 30 from the upper side. In other words, light from the first lens body 60A illuminates the decorative translucent portion 30D of the first decorative illuminator 30C1, so that the first decorative illuminator 30C1 is illuminated in the predetermined pattern.

Second Lens 70

The second lens 70, like the first lens 60, is comprised of the material that can transmit light. The second lens 70 has a second lens body 70A, and the second lens body 70A is formed in the substantially long plate shape with the up-down direction as the thickness direction and extending in the left-right direction. Specifically, the second lens body 70A, like the first lens body 60A, is formed in the substantially U-shape open to the front side when viewed from below so as to fill up the lens housing 10B of the frame 10, and is housed in the lens housing 10B on the lower side of the first lens body 60A.

The second lens 70 has a second lens light guide 70B, and the second lens light guide 70B is formed as a substantially long round bar and bent into the substantially U-shape that is open to the front side when viewed from below. The rear end of the middle of the second lens 70 in the left-right direction is bent upward and connected to the middle of the second lens light guide 70B in the longitudinal direction. The longitudinal ends of the second lens light guide 70B are light-entering portions 70C. The light-entering portions 70C are bent upward and disposed in the second cylinder 10D of the frame 10. The end surfaces of the light-entering portions 70C are formed along a plane perpendicular to the up-down direction and are positioned below the second cabin LED 54. As a result, light irradiated downwardly from the second cabin LED 54 passes through the light-entering portion 70C and the translucent hole 10E of the frame 10 and through the cabin illuminator 32 of the panel 30 to illuminate below the vehicle cabin illumination device 1 in the vehicle compartment CA.

When the second cabin LED 54 is lit, light entering the light-entering portion 70C is guided to the second lens body 70A by the second lens light-guide 70B, and light guided to the second lens body 70A mainly illuminates the second decorative illuminator 30C2 of the decorative illuminator 30C in the panel 30 from the upper side. In other words, light from the second lens body 70A illuminates the decorative translucent portion 30D of the second decorative illuminator 30C2, so that the second decorative illuminator 30C2 is illuminated in the predetermined pattern.

As described further below in detail, the above-mentioned controller 51 controls the first cabin LED 53 and the second cabin LED 54 to turn on and off and controls the brightness of light of the first cabin LED 53 and the second cabin LED 54 when lit to change an illumination form of the decorative illuminator 30C. The controller 51 is electrically connected to an ECU (Electronic Control Unit: not illustrated), which detects and stores information such as a locking and unlocking status of vehicle doors and a vehicle speed. The controller 51 is also electrically connected to an illuminance sensor (not illustrated), which is disposed in the vehicle cabin and can detect the brightness in the cabin.

The above-mentioned side touch buttons 30F1 and 30F2 are used as operators for illuminating areas around the left and right vehicle seats SE respectively by the vehicle cabin illumination device 1 The side touch button 30F3 is used as the operator for illuminating the entire front area in the vehicle cabin CA by the vehicle cabin illumination device 1. Furthermore, the side touch button 30F4 is configured as the operator for switching an interlocking or non-interlocking of the vehicle cabin illumination device 1 with the opening/closing operation of the door (not illustrated) of the vehicle V.

Effects

Next, the actions and effects of the present embodiment will be described while describing the operation of the vehicle cabin illumination device 1.

Figures 10A, 10B, 10C:
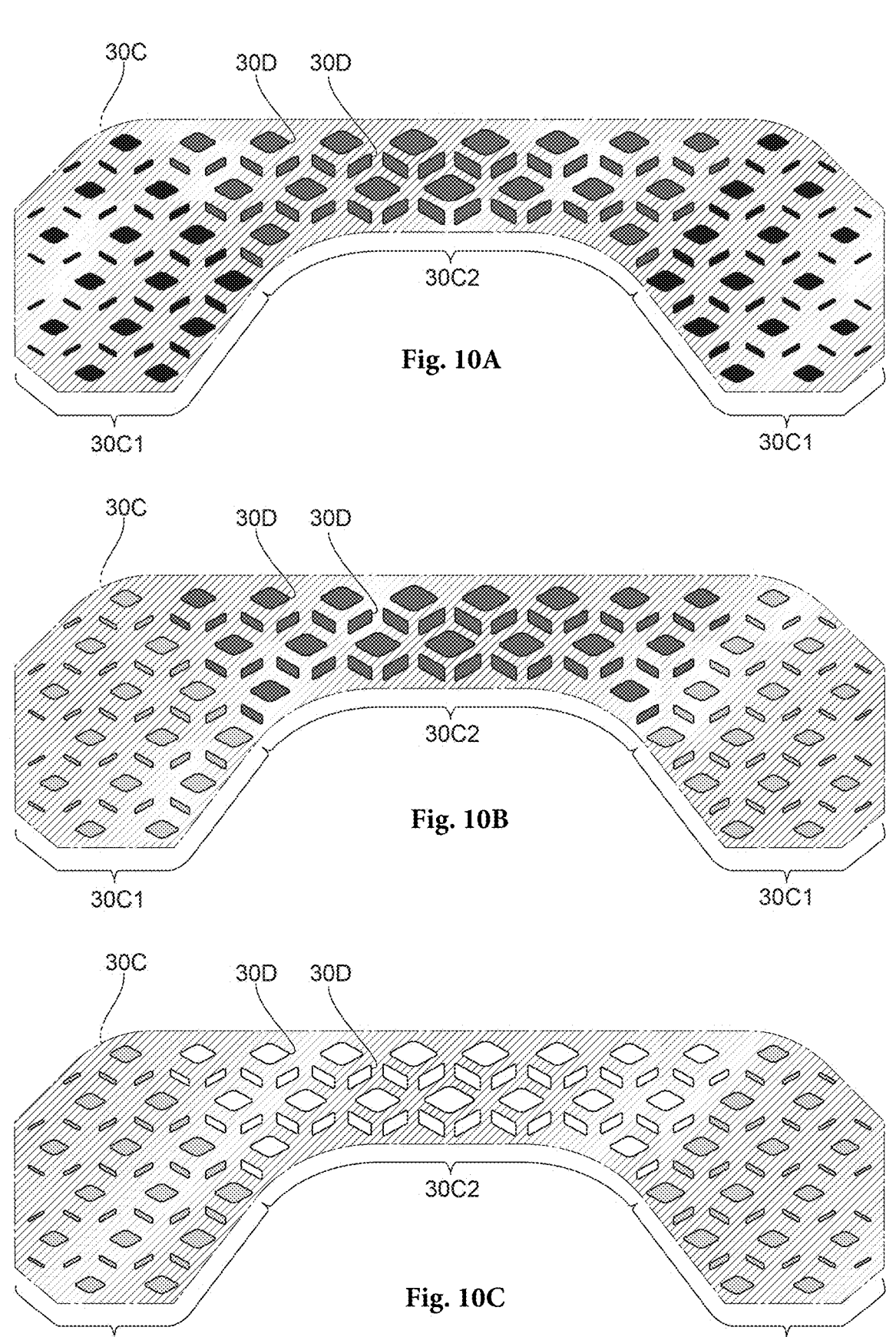
FIG. 10A is the bottom view schematically illustrating a decorative illuminator in a down illumination state of the vehicle cabin illumination device.
FIG. 10B is the bottom view schematically illustrating the decorative illuminator in a spot illumination state of the vehicle cabin illumination device.
FIG. 10C is the bottom view schematically illustrating the decorative illuminator in a room illumination state of the vehicle cabin illumination device.

In a non-operating state of the vehicle cabin illumination device 1, the first cabin LED 53 and second cabin LED 54 are unlit. When the controller 51 detects that the vehicle is in use and that the illuminance in the vehicle cabin is below a predetermined value, the controller 51 lights a left and right pair of the second cabin LEDs 54. Thus, light from the second cabin LED 54 illuminates the cabin illuminator 32 of the panel 30 and the decorative translucent portion 30D of the second decorative illuminator 30C2 in the decorative illuminator 30C. As a result, the decorative illuminator 30C is decorated with the predetermined pattern in the portion of the second decorative illuminator 30C2. In this case, as illustrated in FIG. 10A, the brightness of light irradiated from the second cabin LED 54 is controlled by the controller 51 so that a luminance of the decorative translucent portion 30D in the second decorative illuminator 30C2 is relatively low to prevent eyesores during driving (this state is hereinafter referred to as a "down illumination state").

In other words, when the vehicle is in use and the brightness in the vehicle cabin is below the predetermined value, the second cabin LED 54 is always lit and the vehicle cabin illumination device 1 is in the down illumination state. In the down illumination state, a lower space of the vehicle cabin illumination device 1 is illuminated with reduced luminance by light transmitted from the second cabin LED 54 through the cabin illuminator 32 of the panel 30. In FIG. 10A, the decorative illuminator 30C is hatched, the decorative translucent portion 30D of the first decorative illuminator 30C1 is painted over with black, and the decorative translucent portion 30D of the second decorative illuminator 30C2 is painted over with gray.

When the occupant touches the side touch button 30F1 (side touch button 30F2) in the down illumination state of the vehicle cabin illumination device 1, the first cabin LED 53 on the left side (right side) is lit by the controller 51 while the second cabin LED 54 remains lit. As a result, light from the first cabin LED 53 illuminates the cabin illuminator 32 on the left side (right side) of the panel 30 and the decorative translucent portion 30D of the first decorative illuminator 30C1 on the left side (right side) in the decorative illuminator 30C. In this case, as illustrated in FIG. 10B, the brightness of light irradiated from the second cabin LED 54 is the same as in the down illumination state, and the luminance of the decorative translucent portion 30D of the second decorative illuminator 30C2 is the same as in the down illumination state. The brightness of light irradiated from the first cabin LED 53 is controlled by the controller 51 so that the luminance of the decorative translucent portion 30D of the first decorative illuminator 30C1 is higher than that of the decorative translucent portion 30D of the second decorative illuminator 30C2 (this state is hereinafter called a "spot illumination state").

As a result, in the spot illumination state of the vehicle cabin illumination device 1, mainly the area around the vehicle seat SE is illuminated by the vehicle cabin illumination device 1, and the illumination form of the decorative illuminator 30C is changed so that the luminance of the first decorative illuminator 30C1 is higher than that of the second decorative illuminator 30C2. In FIG. 10B, the state in which both left and right first cabin LEDs 53 are lit is illustrated. Furthermore, in FIG. 10B, the decorative illuminator 30C is hatched and the decorative translucent portion 30D of the first decorative illuminator 30C1 is painted over with gray lighter than the decorative translucent portion 30D of the second decorative illuminator 30C2. When the occupant touches the side touch button 30F1 (side touch button 30F2) again, the controller 51 turns off the left side (right side) first cabin LED 53 and the vehicle cabin illumination device 1 returns to the down illumination state.

When the occupant touches the side touch button 30F3 in the down illumination state of the vehicle cabin illumination device 1, the controller 51 causes light of the second cabin LED 54 to be bright and the first cabin LEDs 53 on both the left and right sides to be lit. When touching the side touch button 30F3, as illustrated in FIG. 10C, the brightness of light irradiated from the first cabin LED 53 is the same as in the spot illumination state, and the luminance of the decorative translucent portion 30D of the first decorative illuminator 30C1 is the same as in the spot illumination state. Furthermore, the brightness of light irradiated from the second cabin LED 54 is controlled by the controller 51 so that the luminance of the decorative translucent portion 30D of the second decorative illuminator 30C2 is higher than that of the decorative translucent portion 30D of the first decorative illuminator 30C1 (this state is hereinafter referred to as a "room illumination state").

As a result, in the room illumination state of the vehicle cabin illumination device 1, the entire front part in the vehicle cabin CA is illuminated by the vehicle cabin illumination device 1, and the illumination form of the decorative illuminator 30C is changed so that the luminance of the decorative translucent portion 30D of the second decorative illuminator 30C2 is higher than that of the decorative translucent portion 30D of the first decorative illuminator 30C1. In FIG. 10C, the decorative illuminator 30C is hatched and the second decorative illuminator 30C2 is painted over with white. When the occupant touches the side touch button 30F3 again, the left and right first cabin LEDs 53 are turned off and the brightness of light irradiated from the second cabin LED 54 is controlled to be the same brightness as in the down illumination state by the controller 51. As a result, the vehicle cabin illumination device 1 returns to the down illumination state.

As described above, in the vehicle cabin illumination device 1, the first cabin LED 53 and the second cabin LED 54 are housed in the case 20. The panel 30 of the case 20 is provided with the cabin illuminator 32, and light irradiated downward from the first cabin LED 53 and the second cabin LED 54 is transmitted through the cabin illuminator 32 to illuminate the vehicle cabin CA. Here, the panel 30 is provided with the decorative illuminator 30C having the decorative translucent portion 30D through which light can be transmitted. The first lens 60 and the second lens 70 are housed in the case 20, and light irradiated from the first cabin LED 53 is guided to a back side (upper side) of the decorative illuminator 30C by the first lens 60, and light irradiated from the second cabin LED 54 is guided to the back side of the decorative illuminator 30C by the second lens 70. As a result, the first cabin LED 53 and the second cabin LED 54 for illuminating inside the vehicle cabin CA can be used to illuminate the decorative illuminator 30C to decorate the vehicle cabin illumination device 1. In other words, the decorative illuminator 30C can be illuminated without installing a separate light source to illuminate the decorative illuminator 30C. Therefore, the design of the vehicle cabin illumination device 1 can be improved while controlling cost increase.

As described above, light irradiated from the first cabin LED 53 is guided to the back side of the decorative illuminator 30C by the first lens 60, and light irradiated from the second cabin LED 54 is guided to the back side of the decorative illuminator 30C by the second lens 70. Therefore, by setting the size and shape of the first lens 60 and the second lens 70 appropriately in response to the size and shape of the decorative illuminator 30C, the decorative illuminator 30C can be easily illuminated.

The radio wave sensor 40 is housed in the sensor housing 22A of the upper case member 22, and the decorative illuminator 30C of the panel 30 is positioned below the radio wave sensor 40, covering the radio wave sensor 40 from below. This allows the decorative illuminator 30C of the panel 30 to be provided on the panel 30 by utilizing a portion of the panel 30 that covers the radio wave sensor 40.

The decorative illuminator 30C has the first decorative illuminator 30C1 that is illuminated by light from the first lens body 60A of the first lens 60 and the second decorative illuminator 30C2 that is illuminated by light from the second lens body 70A of the second lens 70. The decorative illuminator 30C is extended in the vehicle width direction when viewed from below, and the first decorative illuminator 30C1 and the second decorative illuminator 30C2 are arranged side by side in the longitudinal direction of the decorative illuminator 30C. Therefore, the occupant can easily recognize a lit/unlit status of the first cabin LED 53 and the second cabin LED 54. Thus, the convenience for the occupant can be improved.

The first decorative illuminator 30C1 and the second decorative illuminator 30C2 are aligned continuously in the longitudinal direction of the panel 30. Therefore, for example, when the vehicle cabin illumination device 1 is in the room illumination state, the entire decorative illuminator 30C is illuminated, thus enabling a powerful decoration to be realized in the decorative illuminator 30C.

The controller 51 also controls the brightness of light of the first cabin LED 53 and the second cabin LED 54 when they are lit to change the illumination form of the decorative illuminator 30C. Specifically, as described above, during the down illumination state, only the second cabin LED 54 is lit and only the second decorative illuminator 30C2 is lit. During the spot illumination state, the first cabin LED 53 and the second cabin LED 54 are lit so that the luminance of the second decorative illuminator 30C2 is the same as during the down illumination state and the luminance of the first decorative illuminator 30C1 is higher than that of the second decorative illuminator 30C2. Furthermore, in the room illumination state, the first cabin LED 53 and the second cabin LED 54 are lit so that the luminance of the first decorative illuminator 30C1 is the same as in the spot illumination state and the luminance of the second decorative illuminator 30C2 is higher than that of the first decorative illuminator 30C1. This allows for more variations in the illumination form of the decorative illuminator 30C and also makes it easier for the occupant to recognize the illumination state of the vehicle cabin illumination device 1. Therefore, the design of the vehicle cabin illumination device 1 can be effectively improved and the convenience for the occupant can be further enhanced.

The substrate 50 is disposed in the position where it does not overlap with the radio wave sensor 40 when viewed from below, and the first lens 60 and the second lens 70 are disposed between the radio wave sensor 40 and the decorative illuminator 30C. This prevents the radio waves transmitted from the radio wave sensor 40 to the vehicle cabin CA side from being blocked by the substrate 50, and prevents light of the first cabin LED 53 and the second cabin LED 54 provided on the substrate 50 from being blocked by the radio wave sensor 40, while allowing the first lens 60 and the second lens 70 to guide light of the first cabin LED 53 and the second cabin LED 54 to the back side of the decorative illuminator 30C.

EXPLANATION OF THE REFERENCE
NUMERALS

1: Vehicle cabin illumination device
20: Case
30C: Decorative illuminator
30C1: First decorative illuminator
30C2: Second decorative illuminator
32: Cabin illuminator
40: Radio wave sensor
50: Substrate
51: Controller
53: First cabin LED (first light source)
54: Second cabin LED (second light source)
60: First lens 70: Second lens CA: Vehicle cabin

The invention claimed is:

1. A vehicle cabin illumination device comprising:

a first light source that irradiates light toward a vehicle cabin side;

a second light source that irradiates light toward the vehicle cabin side;

a case comprising: a cabin illuminator that houses the first light source and the second light source and illuminates a vehicle cabin by transmitting light irradiated from the first light source and the second light source; and a decorative illuminator having a translucent portion that can transmit light;

a first lens that is housed in the case and guides light irradiated from the first light source to a back side of the decorative illuminator; and a second lens that is housed in the case and guides light irradiated from the second light source to the back side of the decorative illuminator, wherein the case houses a radio wave sensor that detects an entry of an occupant into the vehicle cabin, wherein the decorative illuminator covers the radio wave sensor from the vehicle cabin side, wherein the case houses a substrate, and the substrate is provided with the first light source and the second light source, wherein the substrate is disposed in a position where it does not overlap with the radio wave sensor when viewed from the vehicle cabin side, and wherein the first lens and the second lens are disposed between the radio wave sensor and the decorative illuminator.

2. The vehicle cabin illumination device according to claim 1, wherein the decorative illuminator has a first decorative illuminator illuminated by light from the first lens and a second decorative illuminator illuminated by light from the second lens, wherein as viewed from the vehicle cabin side, the decorative illuminator extends in a width direction of a vehicle, and the first decorative illuminator and the second decorative illuminator are arranged side by side in a longitudinal direction of the decorative illuminator.

3. The vehicle cabin illumination device according to claim 2 wherein the first decorative illuminator and the second decorative illuminator are aligned continuously in the longitudinal direction of the decorative illuminator.

4. The vehicle cabin illumination device according to claim 1, wherein the first light source and the second light source are controlled on and off by a controller, wherein the controller controls a brightness of light of the first light source and the second light source when lit to change an illumination form of the decorative illuminator.

5. The vehicle cabin illumination device according to claim 3, wherein the first light source and the second light source are controlled on and off by a controller, wherein the controller controls a brightness of light of the first light source and the second light source when lit to change an illumination form of the decorative illuminator.

\* \* \* \* \*